United States Patent
Li et al.

(10) Patent No.: US 9,897,249 B2
(45) Date of Patent: Feb. 20, 2018

(54) ELECTRONIC DEVICE AND ELECTRONIC SYSTEM

(71) Applicant: ASUSTeK COMPUTER INC., Taipei (TW)

(72) Inventors: Shih-Chuan Li, Taipei (TW); Chia-Sien Lin, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 0 days.

(21) Appl. No.: 15/389,456

(22) Filed: Dec. 23, 2016

(65) Prior Publication Data

US 2017/0191608 A1  Jul. 6, 2017

(30) Foreign Application Priority Data

Dec. 30, 2015  (TW) .............................. 104144437 A

(51) Int. Cl.
*F16M 13/00* (2006.01)
*A47B 23/04* (2006.01)
*G06F 1/16* (2006.01)

(52) U.S. Cl.
CPC ........... *F16M 13/005* (2013.01); *A47B 23/04* (2013.01); *G06F 1/1626* (2013.01); *G06F 1/1656* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,561,420 | B2 * | 7/2009 | Chueh | G06F 1/1616 361/679.55 |
| 8,888,063 | B2 * | 11/2014 | Mack | F16M 11/00 248/121 |
| 9,195,263 | B2 * | 11/2015 | Mack | F16M 11/00 |
| 9,565,909 | B2 * | 2/2017 | Song | A45C 11/00 |
| 9,680,253 | B2 * | 6/2017 | Mehandjiysky | G06F 1/1632 |
| 9,706,089 | B2 * | 7/2017 | Beck | G06F 1/1618 |
| 2007/0075208 | A1 * | 4/2007 | Chen | F16M 11/10 248/455 |
| 2009/0321609 | A1 * | 12/2009 | Wang | G06F 1/1626 248/685 |
| 2010/0238620 | A1 | 9/2010 | Fish | |
| 2013/0229100 | A1 * | 9/2013 | Siddiqui | G06F 1/1618 312/326 |

(Continued)

FOREIGN PATENT DOCUMENTS

| | | |
|---|---|---|
| CN | 102523320 | 6/2012 |
| CN | 104331123 | 2/2015 |
| TW | 201427572 | 7/2014 |

*Primary Examiner* — Lisa Lea Edmonds
(74) *Attorney, Agent, or Firm* — JCIPRNET

(57) ABSTRACT

An electronic device adapted to a base with a second magnetic member is provided. The base is detachably connected to the electronic device. The electronic device includes a body, a supporting member movably disposed at the body and a first magnetic member disposed at the supporting member. Magnetisms of an end of the second magnetic member and an end of the first magnetic member are the same. When the base is assembled to the body, the second magnetic member repulses the first magnetic member, and the supporting member is driven to move out of the body. An electronic system is also provided.

12 Claims, 8 Drawing Sheets

(56) References Cited

U.S. PATENT DOCUMENTS

| | | | |
|---|---|---|---|
| 2014/0036430 A1* | 2/2014 | Wroblewski | G06F 1/1626 |
| | | | 361/679.4 |
| 2014/0293534 A1* | 10/2014 | Siddiqui | E05D 7/00 |
| | | | 361/679.55 |
| 2016/0239048 A1* | 8/2016 | Mehandjiysky | G06F 1/1626 |
| 2017/0150792 A1* | 6/2017 | Kim | B08B 3/022 |
| 2017/0168524 A1* | 6/2017 | Kim | G06F 1/1626 |
| 2017/0220075 A1* | 8/2017 | Park | G06F 1/1656 |
| 2017/0262018 A1* | 9/2017 | Kim | G06F 1/1616 |

\* cited by examiner

ELECTRONIC DEVICE AND ELECTRONIC SYSTEM

CROSS-REFERENCE TO RELATED APPLICATION

This application claims the priority benefit of TW application serial No. 104144437, filed on Dec. 30, 2015. The entirety of the above-mentioned patent application is hereby incorporated by references herein and made a part of specification.

BACKGROUND OF THE INVENTION

Field of the Invention

The invention relates to an electronic device and an electronic system.

Description of the Related Art

Nowadays, tablet computers are popular. However, compared with a notebook with a physical keyboard, a tablet computer still has its shortcomings in text input. Therefore, a base with a physical keyboard is configured for the tablet computer as a physical input unit.

After the base is assembled to the tablet computer, the tablet computer should be placed on a supporter, for example, a bookshelf-like supporter to hold the tablet computer. The tablet computer is therefore output information by the screen, and texts or symbols are input via the external keyboard, which allows a user to operate the tablet computer habitually.

However, when the tablet computer is assembled to the base, the center of the gravity of the whole assembled structure is shifted because the tablet computer is inclined on the base. Consequently, the whole assembled structure is easy to tip over when the gravity force of the tablet computer is stronger than the base weight.

BRIEF SUMMARY OF THE INVENTION

According to an aspect, an electronic device adapted to a base with a second magnetic member is provided. The base is detachably connected to the electronic device. The electronic device comprises a body, a supporting member movably disposed at the body, and a first magnetic member disposed at the supporting member. Magnetisms of an end of the second magnetic member and an end of the first magnetic member are the same. When the base is assembled to the body, the second magnetic member repulses the first magnetic member, and the supporting member is driven to move out of the body.

According to another aspect, an electronic system comprising an electronic device and a base detachably connected to the body is provided. The electronic device includes a body, a supporting member and a first magnetic member. The supporting member is movably disposed at the body to be received in the body or move out of the body. The first magnetic member is disposed on the supporting member. The base includes a second magnetic member. Magnetisms of an end of the second magnetic member and an end of the first magnetic member are the same. When the base is assembled to the body, the second magnetic member repulses the first magnetic member, and the supporting member is driven to move out of the body.

In sum, when the electronic device and the base are assembled, the supporting member disposed at the body of the electronic device moves out of the body due to the magnetic force generated therebetween, and thus the supporting member supports the body. Therefore, no additional supporting structure is needed for the electronic device to stand on a plane when the electronic device is assembled to the base. Furthermore, the assembled electronic device would not turn over due to the shift of the center-of-gravity.

BRIEF DESCRIPTION OF THE DRAWINGS

These and other features, aspects and advantages of the invention will become better understood with regard to the following embodiments and accompanying drawings.

DETAILED DESCRIPTION OF THE EMBODIMENTS

Figure 1:
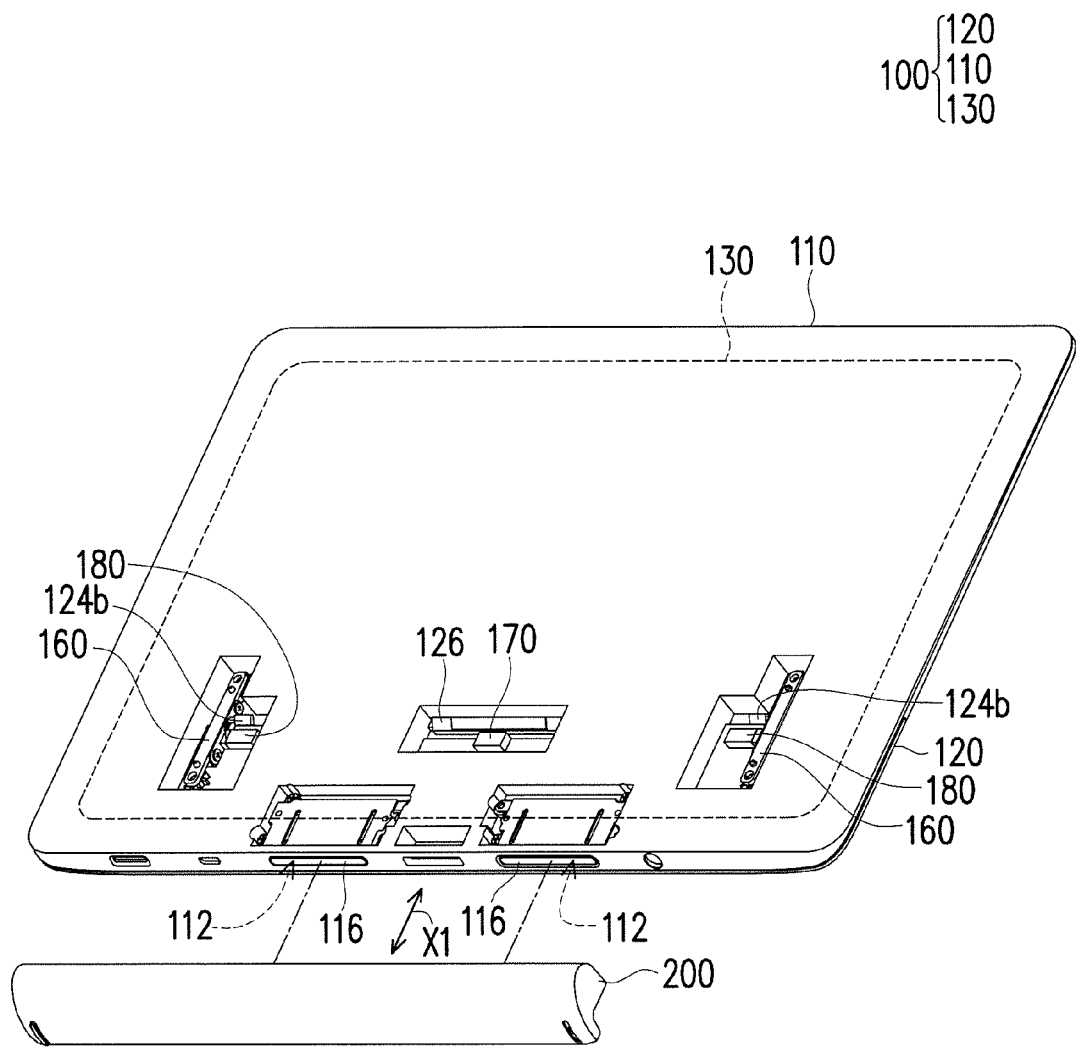
FIG. 1 and FIG. 2 are schematic diagrams showing an electronic system in assembling from different views in an embodiment.
Figure 2:
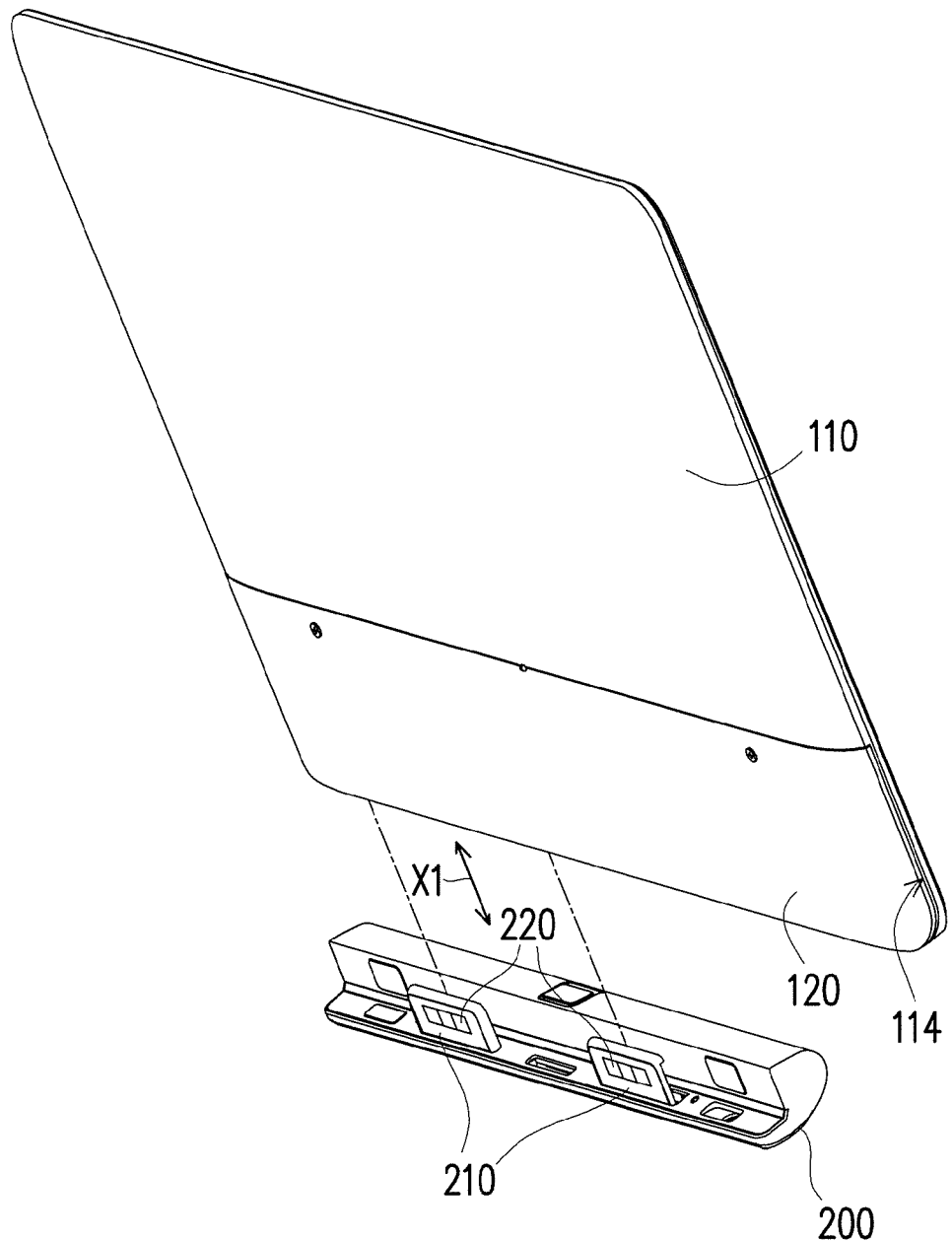
Figure 3:
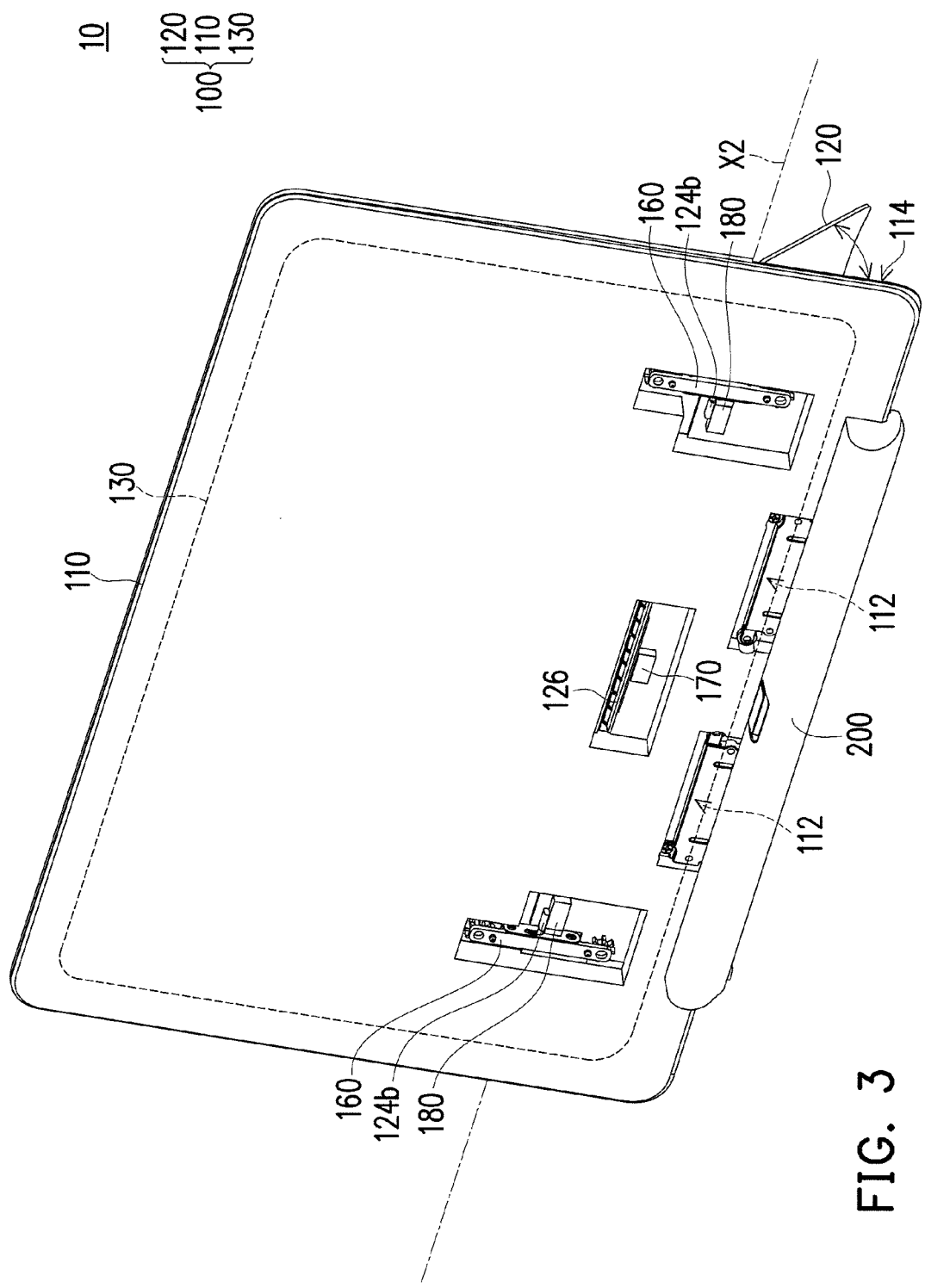
FIG. 3 is a schematic diagram showing the electronic system in FIG. 1 after assembled in an embodiment.

FIG. 1 and FIG. 2 are schematic diagrams showing an electronic system in assembling from different views in an embodiment. FIG. 3 is a schematic diagram showing the electronic system in FIG. 1 after assembled in an embodiment. Please refer to FIG. 1 to FIG. 3, in an embodiment, an electronic system 10 includes an electronic device 100 and a base 200. In an embodiment, the electronic device 100 is a portable electronic device, such as a tablet computer. In figures, the base 200 is simply shown, however, the type of the base 200 is not limited herein. The electronic device 100 is assembled to the base 200 detachably, and then the function of the electronic device 100 is expanded (for example, an input unit such as a keyboard, or an external device such as a charging dock and a speaker (not shown), is expanded). To clearly show the components to be assembled and the assembly relationship therebetween, fasteners such as screws between the components are not shown in the figures.

In an embodiment, the electronic device 100 includes a body 110 and a display unit 130. To clearly show the detail structures, the display unit 130 (such as a touch screen) is shown with dash lines, and partial of the body 110 are not shown. The body 110 includes a slot 112. The base 200 includes a connecting portion 210 vertically disposed at an L-shaped supporting seat. The connecting portion 210 is inserted into the corresponding slot 112, and then the electronic device 100 is assembled to the base 200. The slot 112 indicated by dash lines in FIG. 1 and FIG. 3 represents an inner space of the structure that can be seen from the physical structure shown with full lines, which will be further illustrated in the subsequent figures.

As shown in FIG. 3, the electronic device 100 further includes a supporting member 120. The supporting member 120 is pivotally connected to the body 110. After the electronic device 100 is assembled to the base 200, the supporting member 120 rotates relative to the body 110 to support the body 110. The supporting member 120, which is disposed at the back of the display unit 130, rotates towards a direction away from the base 200 to expand out from a recess structure 114 of the body 110 to support the electronic device 100, and then the electronic device 100 stands stably on the base 200 after the electronic device 100 is assembled to the base 200. When the electronic device 100 is removed from the base 200, the supporting member 120 rotates to be received in the recess structure 114 of the body 110, and an outer surface of the supporting member 120 is flushed with the outer surface of the body 110, as shown in FIG. 2.

Figure 4:
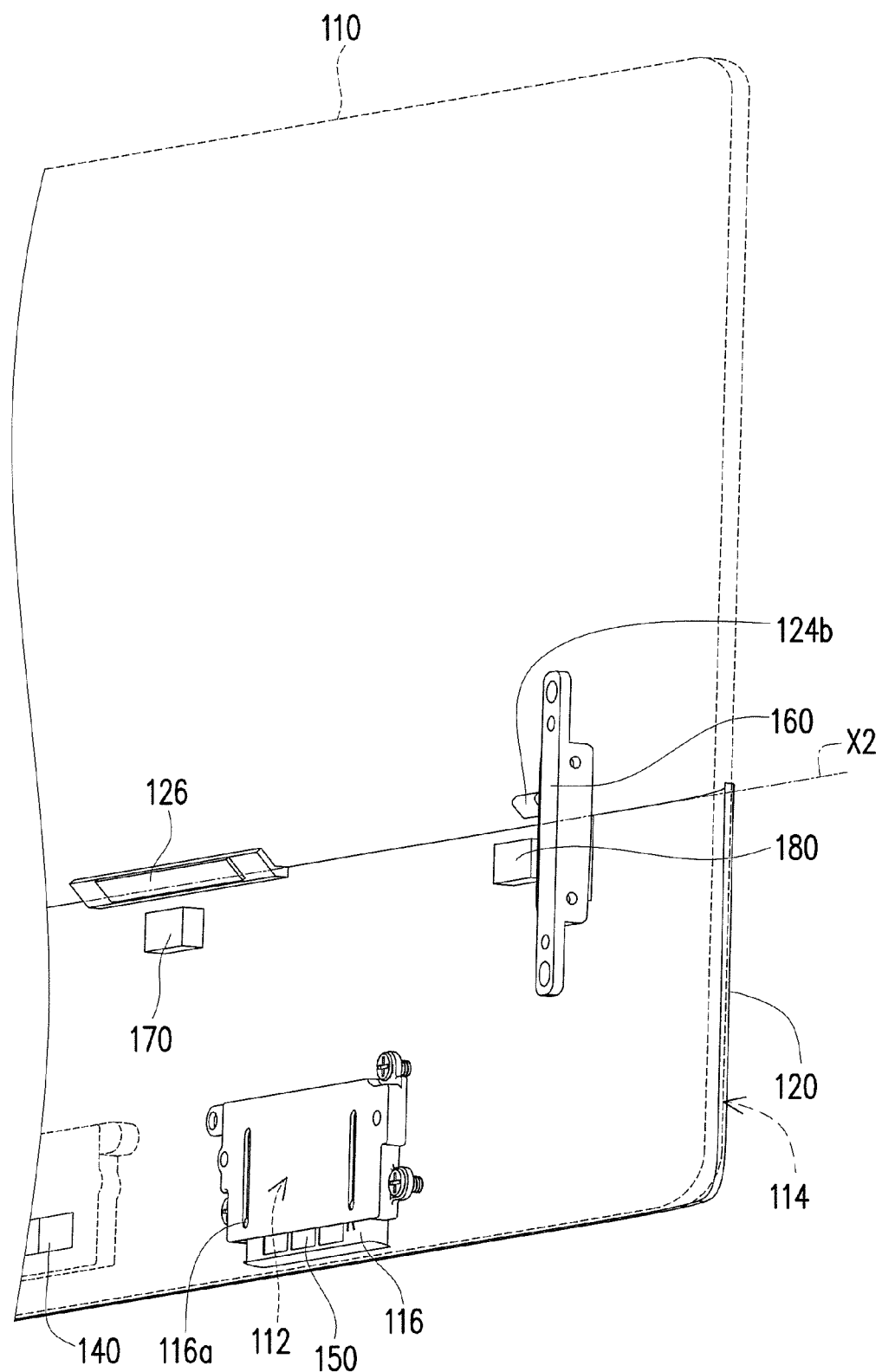
FIG. 4 and FIG. 5 are enlarged diagrams showing partial of an electronic device in different states.
Figure 5:
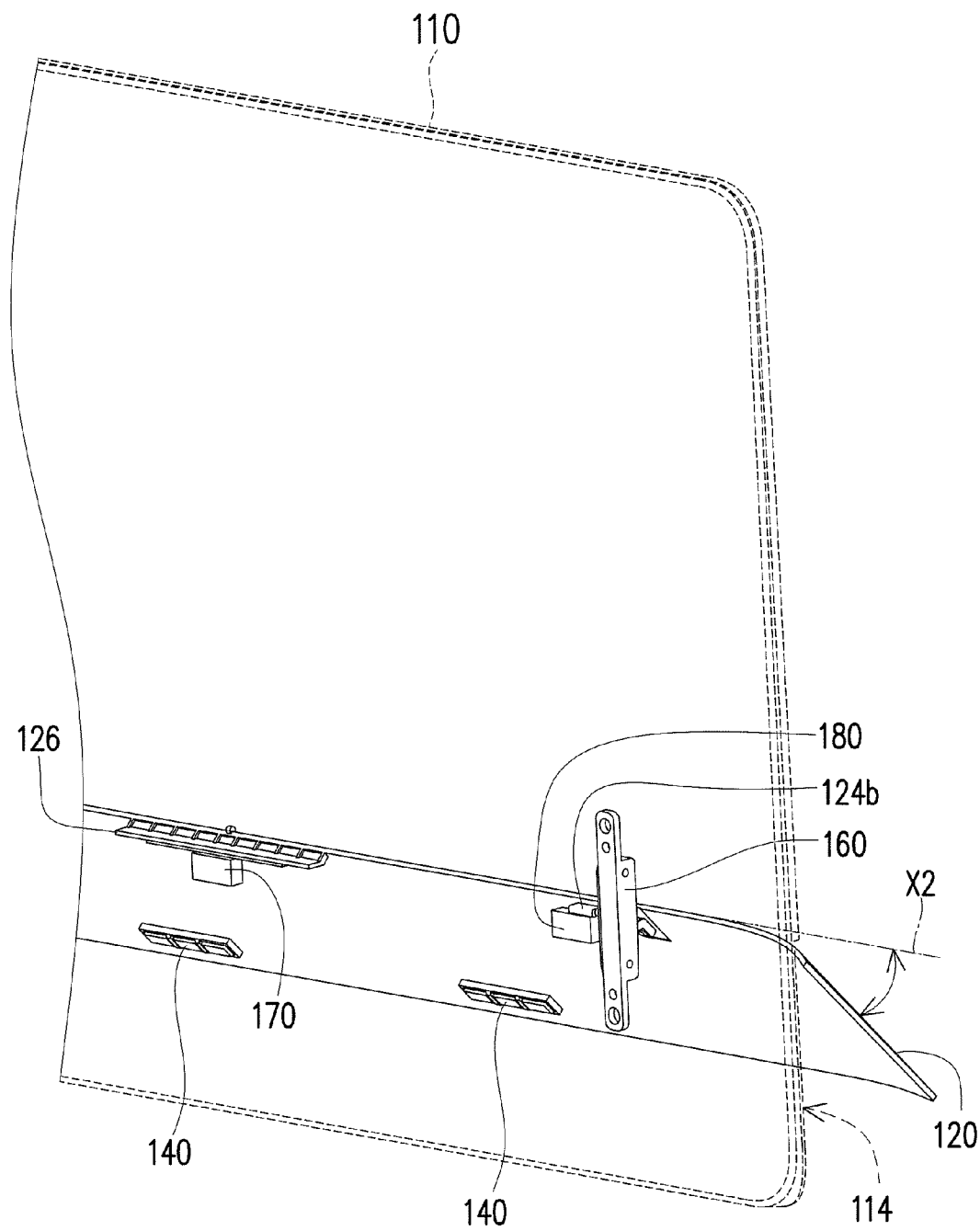

FIG. 4 and FIG. 5 are enlarged diagrams showing partial of an electronic device in different states. Since the components of the electronic device 100 are arranged substantially in a bilaterally symmetrical manner, only one side portion of the electronic device 100 is illustrated in FIG. 4 and FIG. 5. To clearly show the relevant structures of the supporting member 120, the base 200 is not shown and the body 110 of the electronic device 100 is perspective in FIG. 4 and FIG. 5. FIG. 4 corresponds to FIG. 1 and FIG. 2 showing the electronic device 100 in a state that the supporting member 120 is received in the recess structure 114 of the body 110. FIG. 5 corresponds to FIG. 3 showing the electronic device 100 in another state that the supporting member 120 expands out from the recess structure 114 of the body 110.

Please refer to FIG. 2, FIG. 4 and FIG. 5, the electronic device 100 further includes a first magnetic member 140 configured at the supporting member 120. The first magnetic member 140 moves relative to the body 110 along with the supporting member 120. To clearly show the positional relationship between the first magnetic member 140 and the slot 112, some of the slots 112 at one side of the electronic device are not shown in FIG. 4. The base 200 includes a second magnetic member 220 configured at the connecting portion 210. An end of the second magnetic member 220 and an end of the first magnetic member 140 has a same magnetism. Therefore, when the second magnetic member 220 is inserted into the slot 112 with the connecting portion 210, a magnetic repulsion force is generated between these two ends of the first magnetic member 140 and the second magnetic member 220. Thus the supporting member 120 moves out from the recess structure 114 of the body 110.

Figure 6:
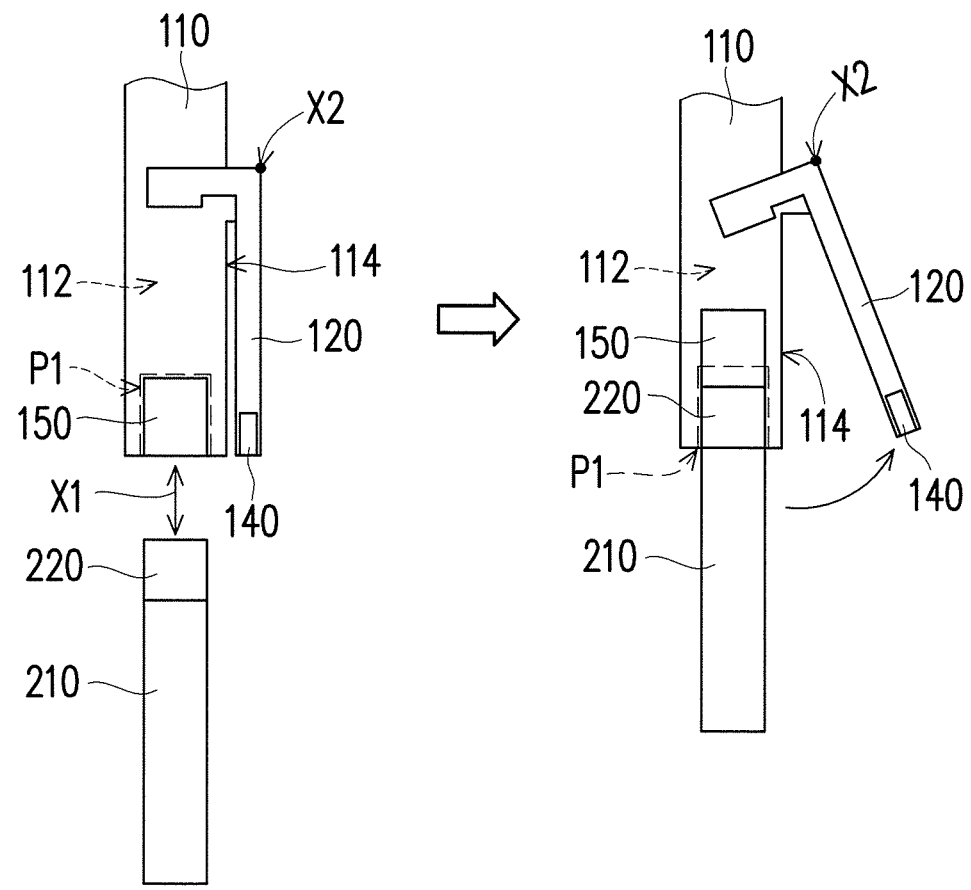
FIG. 6 is a schematic diagram showing magnetic members in moving in an embodiment.

FIG. 6 is a schematic diagram shows how the magnetic members move in an embodiment. A magnetic member is mainly shown in FIG. 6 and partial components are not shown. Please refer to FIG. 4 to FIG. 6, when the second magnetic member 220 moves towards the slot 112 along an axis X1 to a trigger position P1 along with the connecting portion 210, the magnetic repulsion force generated between two ends of the first magnetic member 140 and the second magnetic member 220 drives the supporting member 120 to move.

The trigger position P1 is a position where the magnetic members interact (mutually attract or repel) with each other to drive the relevant member via a magnetic force.

In an embodiment, the electronic device 100 further includes a third magnetic member 150. The third magnetic member 150 is movably configured at the body 110. The magnetism of an end of the third magnetic member 150 is opposite to that of an end of the first magnetic member 140. When the base 200 is removed from the electronic device 100, the third magnetic member 150 is at the trigger position P1 and magnetically attracts the first magnetic member 140, as shown on the left side of FIG. 6, and then the supporting member 120 is received in the recess structure 114 of the body 110. When the base 200 is assembled to the body 110 of the electronic device 100, the second magnetic member 220 moves to the trigger position P1 to drive the third magnetic member 150 to move away, as shown on the right side of FIG. 6.

Figure 7:
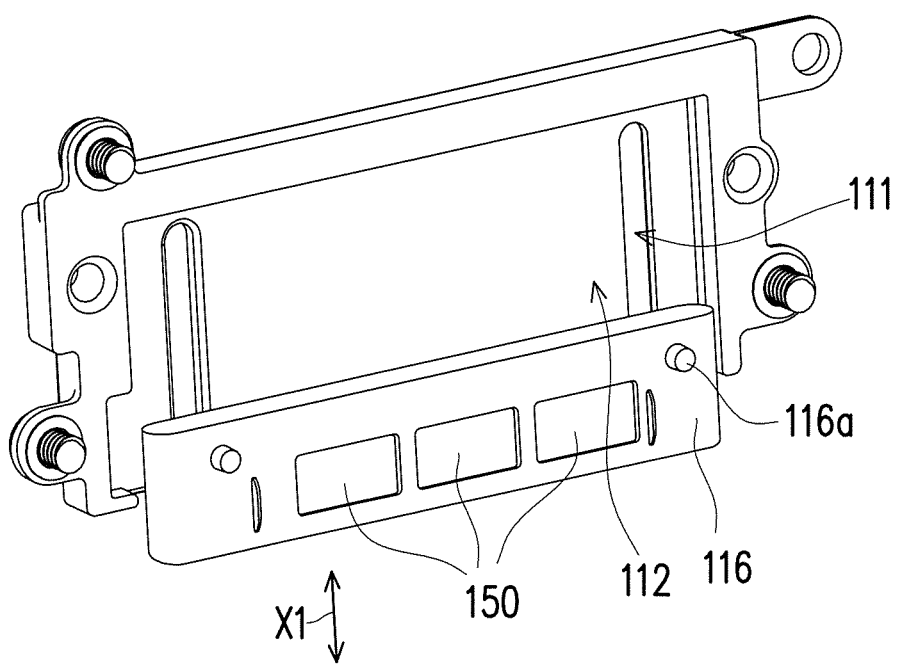
FIG. 7 is a schematic diagram showing a structure of the body at a slot.

FIG. 7 is a schematic diagram showing a structure of the body at a slot. FIG. 7 is an enlarged diagram showing partial structure at the slot 112 from the view of FIG. 4. Please refer to FIG. 4, FIG. 6 and FIG. 7, the body 110 includes a moving member 116. The moving member 116 is movably configured inside the slot 112 along the axis X1. As shown in FIG. 7, the moving member 116 is connected to sliding chutes 111 that are configured in the slot 112 via guiding pillars 116a, and thus the moving member 116 is able to be moved back and forth along the axis X1. In such a way, when the base 200 is inserted into the slot 112 along the axis X1 with the connecting portion 210, the second magnetic member 220 disposed at the connecting portion 210 moves to the trigger position P1, and the connecting portion 210 pushes against the moving member 116 to make the moving member 116 move away from the trigger position P1 as shown on the right side of FIG. 6. That is, the moving member 116 is pushed towards the deep of the slot 112. Since the magnetism of an end of the second magnetic member 220 is opposite to that of an end of the third magnetic member 150, the moving member 116 is attached to the connecting portion 210 due to a magnetic attraction force generated therebetween.

Figure 8:
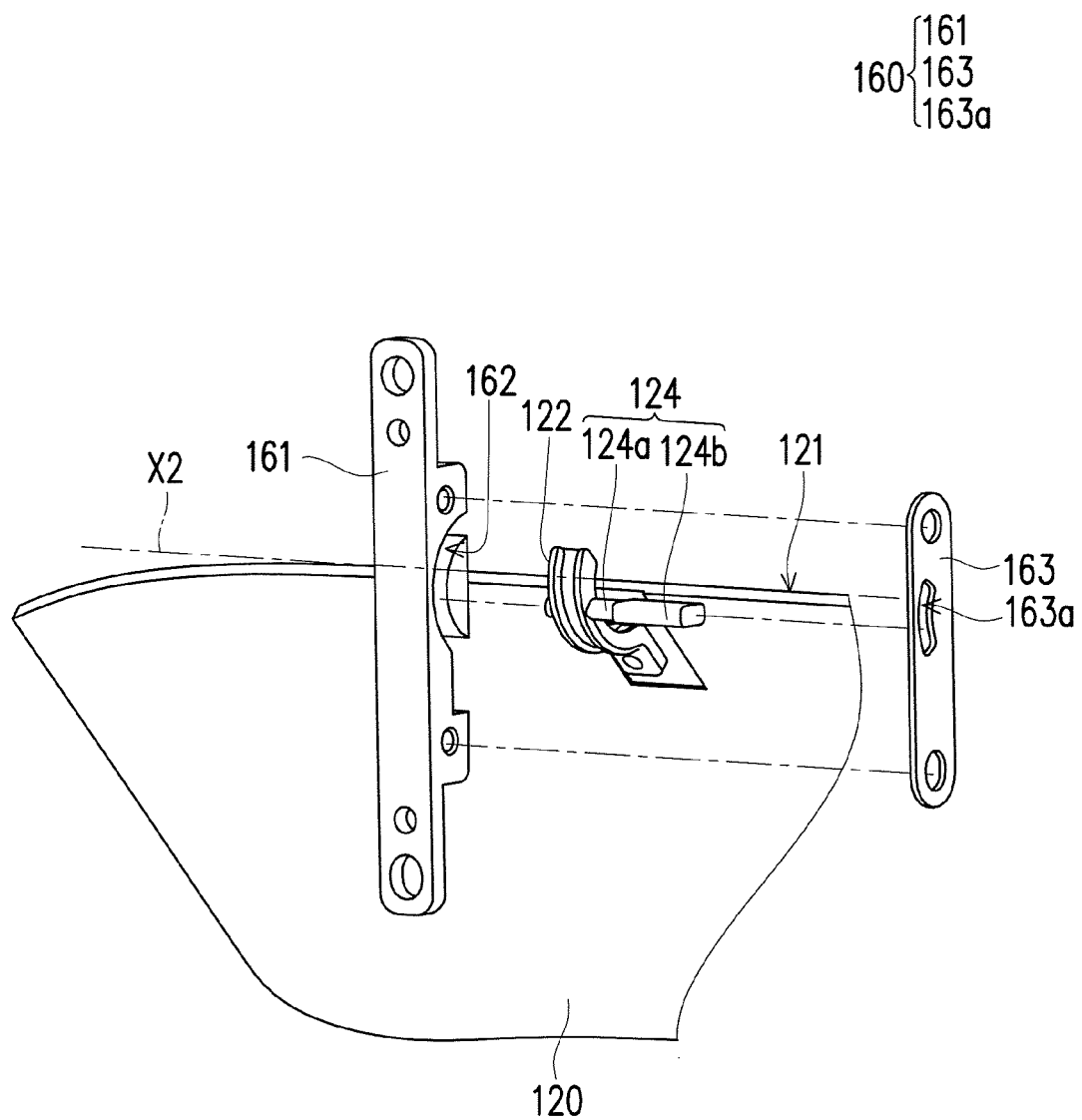
FIG. 8 is an exploded view of a partial structure between the supporting member and the body in FIG. 5.

FIG. 8 is an exploded view of a partial structure between the supporting member and the body in FIG. 5. FIG. 8 shows a pivot mechanism that the supporting member 120 is pivotable relative to the body 110. Please refer to FIG. 5 and FIG. 8, in an embodiment, the electronic device 100 further includes a hinge bracket 160. The hinge bracket 160 is disposed at the body 110 and includes a guiding slot 162. The supporting member 120 includes a pivot portion 122. The pivot portion 122 extends from the side edge 121 and is pivotally connected to the hinge bracket 160. Thus, the pivot portion 122 rotates about an axis X2.

In the embodiment, the hinge bracket 160 includes a bracket body 161 and a lid 163. The bracket body 161 includes the guiding slot 162. The lid 163 is assembled to the bracket body 161 and covers the guiding slot 162. Only the guiding slot 162 is partially exposed from an opening 163a of the lid 163 (the opening 163a includes a curved outline corresponding to the guiding slot 162, and the arc length of the curved outline is shorter than that of the guiding slot 162). In the embodiment, both the guiding slot 162 and the pivot portion 122 have curved outlines. That is, the pivot portion 122 extending from the side edge 121 of the supporting member 120 is movably connected to the guiding slot 162 (which has the corresponding curved outline) via the curved outline of the pivot portion 122. Thus, the supporting member 120 rotates about the axis X2. In other words, the supporting member 120 rotates about the side edge 121 (as the pivot axis).

In the embodiment, the supporting member 120 further includes a protruding rod 124 extending from the pivot portion 122. The protruding rod 124 protrudes movably through the opening 163a and extends out of the lid 163. The first portion 124a of the protruding rod 124 passes through the opening 163a, the second portion 124b protrudes out of the lid 163, and the second portion 124b has a sectional area greater than that of the opening 163a. Thus, the protruding rod 124 is provided to restrict the lid 163 of the hinge bracket 160, which is regarded as a stopping mechanism at both sides of the opening 163a when the supporting member 120 rotates about the axis X2.

Please refer to FIG. 4 and FIG. 5, in the embodiment, the supporting member 120 further includes a stopping portion 126. In an embodiment, the stopping portion 126 is located between a pair of hinge brackets 160. The electronic device 100 further includes a fourth magnetic member 170. The stopping portion 126 extends from the side edge 121. The fourth magnetic member 170 is disposed at the body 110 and located in a moving path of the stopping portion 126. The stopping portion 126 is magnet-conductive. Therefore, when the supporting member 120 rotates out of the recess structure 114 of the body 110 via the pivot portion 122 and the hinge bracket 160 (as shown in FIG. 5), the fourth magnetic member 170 magnetically attracts the stopping portion 126, and thus the supporting member 120 which moves out of the recess structure 114 is kept in a supporting position as shown in FIG. 5.

Similarly, the electronic device 100 further includes a fifth magnetic member 180. The fifth magnetic member 180 is disposed at the body 110 and located in a moving path of the second portion 124b of the protruding rod 124 (which protrudes out of the guiding slot 162). The second portion 124b of the protruding rod 124 is magnet-conductive. Therefore, when the supporting member 120 rotates out of the body 110 via the pivot portion 122 and the hinge bracket 160, the fifth magnetic member 180 magnetically attracts the second portion 124b of the protruding rod 124, and thus the supporting member 120 is kept in the supporting position. As a result, based on the magnetic attraction between the fourth magnetic member 170 and the stopping portion 126 of the supporting member 120, and/or the magnetic attraction between the fifth magnetic member 180 and the protruding rod 124, the supporting member 120 can be kept in the supporting position that the supporting member 120 moves out of the recess structure 114, as shown in FIG. 5.

In sum, in the embodiments, the electronic device includes a supporting member which is pivotable relative to the body. When the electronic device and the base are assembled as the electronic system, the second magnetic member of the base moves to the trigger position where the magnetic repulsion force is generated between an end of the first magnetic member of the supporting member and an end of the second magnetic member of the base. Thus, the supporting member is driven to rotate out of the recess structure of the body and acts as a support for supporting the body. When the electronic device is detached from the base, the supporting member is kept in the recess structure of the body via the magnetic attraction force between an end of the third magnetic member and the end of the first magnetic member. Thus, the supporting member is driven to be moved out of, or, be received in the body correspondingly when the electronic device is assembled to or detached from the base, which improves the convenience in use.

Although the invention has been disclosed with reference to certain embodiments thereof, the disclosure is not for limiting the scope. Persons having ordinary skill in the art may make various modifications and changes without departing from the scope of the invention. Therefore, the scope of the appended claims should not be limited to the description of the embodiments described above.

What is claimed is:

1. An electronic device adapted to a base having a second magnetic member, the base is detachably connected to the electronic device, the electronic device comprising:
   a body;
   a supporting member movably disposed at the body; and
   a first magnetic member disposed on the supporting member;
   wherein magnetisms of an end of the second magnetic member and an end of the first magnetic member are the same, and when the base is assembled to the body, the second magnetic member repulses the first magnetic member, and the supporting member is driven to move out of the body.

2. The electronic device according to claim 1, wherein the electronic device further includes a third magnetic member movably disposed at the body, the magnetism of the first magnetic member and the third magnetic member are opposite, and when the base is detached from the electronic device, the third magnetic member attracts the first magnetic member to make the supporting member received in the body.

3. The electronic device according to claim 2, wherein the body includes a slot and a moving member, the moving member is movably configured inside the slot, the third magnetic member is disposed at the moving member, the base includes a connecting portion, the second magnetic member is disposed at the connecting portion, when the base is assembled to the body via the combination of the connecting portion and the slot, the second magnetic member is driven by the connecting portion to move out of the body.

4. The electronic device according to claim 1, wherein when the base is assembled to the body and moves to a trigger position, the supporting member moves in a direction away from the base.

5. The electronic device according to claim 1, wherein the body includes a recess structure, the supporting member is received in the recess structure, and the supporting member and the body have a consistent appearance.

6. The electronic device according to claim 1, further comprising:
   a hinge bracket disposed at the body, the hinge bracket includes a guiding slot, the supporting member includes a pivot portion and a protruding rod, the pivot portion extends from a side edge of the supporting member and is movably connected to the guiding slot, the protruding rod extends out of the guiding slot from the pivot portion.

7. An electronic system, comprising:
   an electronic device including a body, a supporting member and a first magnetic member, wherein the supporting member is movably disposed at the body to be received in the body or move out of the body, and the first magnetic member is disposed at the supporting member; and
   a base detachably connected to the body and including a second magnetic member, wherein magnetisms of an end of the second magnetic member and an end of the first magnetic member are the same;
   wherein when the base is assembled to the body, the second magnetic member repulses the first magnetic member, and the supporting member is driven to move out of the body.

8. The electronic system according to claim 7, wherein the electronic device further includes a third magnetic member movably disposed at the body, the magnetism of the first magnetic member and the third magnetic member are opposite, and when the base is detached from the electronic device, the third magnetic member attracts the first magnetic member to make the supporting member received in the body.

9. The electronic system according to claim 8, wherein the body includes a slot and a moving member, the moving member is movably configured inside the slot, the third magnetic member is disposed at the moving member, the base includes a connecting portion, the second magnetic member is disposed at the connecting portion, when the base is assembled to the body via the combination of the connecting portion and the slot, the second magnetic member is driven by the connecting portion to move out of the body.

10. The electronic system according to claim 7, wherein when the base is assembled to the body and moves to a trigger position, the supporting member moves in a direction away from the base.

11. The electronic system according to claim 7, wherein the body includes a recess structure, the supporting member is received in the recess structure, and the supporting member and the body have a consistent appearance.

12. The electronic system according to claim 7, wherein the electronic device further comprises:
   a hinge bracket disposed at the body, the hinge bracket includes a guiding slot, the supporting member includes a pivot portion and a protruding rod, the pivot portion extends from a side edge of the supporting member and is movably connected to the guiding slot, the protruding rod extends out of the guiding slot from the pivot portion.

* * * * *